(12) United States Patent
McPhetrige

(10) Patent No.: US 8,315,923 B2
(45) Date of Patent: Nov. 20, 2012

(54) METHOD OF DETERMINING SAFETY STOCK LEVELS

(76) Inventor: David McPhetrige, Arvada, CO (US)

( * ) Notice: Subject to any disclaimer, the term of this patent is extended or adjusted under 35 U.S.C. 154(b) by 1263 days.

(21) Appl. No.: 11/971,441

(22) Filed: Jan. 9, 2008

(65) Prior Publication Data

US 2008/0177599 A1    Jul. 24, 2008

Related U.S. Application Data

(60) Provisional application No. 60/884,065, filed on Jan. 9, 2007.

(51) Int. Cl.
*G06Q 10/00* (2012.01)
*G06G 1/14* (2006.01)
*G06Q 20/00* (2012.01)

(52) U.S. Cl. .......................................... 705/28; 705/22

(58) Field of Classification Search ............... 705/7, 1.1, 705/28, 22
See application file for complete search history.

(56) References Cited

U.S. PATENT DOCUMENTS

| | | | |
|---|---|---|---|
| 8,209,242 B1 | 6/2012 | Henderson | |
| 2002/0143669 A1* | 10/2002 | Scheer | 705/28 |
| 2002/0161674 A1* | 10/2002 | Scheer | 705/28 |
| 2003/0050870 A1* | 3/2003 | Cargille et al. | 705/28 |
| 2004/0153187 A1* | 8/2004 | Knight et al. | 700/99 |
| 2005/0075949 A1* | 4/2005 | Uhrig et al. | 705/28 |
| 2005/0114235 A1* | 5/2005 | Snyder et al. | 705/28 |
| 2005/0209732 A1* | 9/2005 | Audimoolam et al. | 700/216 |
| 2005/0288989 A1* | 12/2005 | Kim et al. | 705/10 |
| 2005/0288993 A1* | 12/2005 | Weng et al. | 705/10 |
| 2007/0270990 A1* | 11/2007 | Katircioglu | 700/99 |
| 2008/0015721 A1* | 1/2008 | Spearman | 700/99 |

OTHER PUBLICATIONS

Buzacott, J A, and Shanthikumar, J G. "Safety stock versus safety time in MRP controlled production." Management Science 40.12 (1994): 1678-1689. ABI/INFORM Global, ProQuest. Web. Jul. 16, 2012.*

* cited by examiner

*Primary Examiner* — Seye Iwarere
(74) *Attorney, Agent, or Firm* — Lathrop & Gage LLP

(57) ABSTRACT

Methods, software products, and systems for determining safety stock levels are set forth herein. In one embodiment, a method of determining safety stock levels includes the steps: determining aggregate top-level product demands; determining aggregate top-level product demand variations; determining aggregate top-level product target service levels; determining respective smoothing time frames for a plurality of mixed-product lines; and incorporating aggregate top-level product demands, aggregate top-level product demand variations, aggregate top-level product target service levels, and smoothing time frames into a material requirements planning system to determine safety stock levels. In another embodiment, a method of determining safety stock levels includes the steps: determining aggregate top-level product demands; determining aggregate top-level product demand variations; determining aggregate top-level product target service levels; and using the aggregate top-level product demands, the aggregate top-level product demand variations, and the aggregate top-level product target service levels to determine safety stock levels.

8 Claims, 5 Drawing Sheets

|   | A | B | C | D | E | F |
|---|---|---|---|---|---|---|
| 1 | ITEM INFORMATION (SKU, TOP LEVEL PRODUCT) | | | PRODA [100a] | PRODB | PRODC |
| 2 | FORECAST | | | 80 | 15 | 5 |
| 3 | FORECAST | | [100c] [100b] | 20 | 15 | 10 |
| 4 | FORECAST | | | 98.0% | 95.0% | 98.0% |
| 5 | ITEM INFORMATION (SKU, TOP LEVEL, PRODUCT) | | | LF1 | LF1 | LF1 |
| 6 | | | | | | |
| 7 | | LINE LF1 | | | | |
| 8 | Accumulate and Aggregate | 100 | [100d] | | | |
| 9 | Accumulate and Aggregate | 26.926 | [100e] | | | |
| 10 | Accumulate and Aggregate | 97.6% | [100f] | | | |
| 11 | Algorithm or Empirical Model | 2 | | [100h] | | |
| 12 | LINE INFORMATION | 3 | | | | |
| 13 | | | | | | |
| 14 | ITEM INFORMATION (SKU, TOP LEVEL PRODUCT) | | | 80 | 15 [100g] | 5 |
| 15 | ITEM INFORMATION (SKU, TOP LEVEL PRODUCT) | | | 14.142 | 10.607 | 7.071 |
| 16 | ITEM INFORMATION (SKU, TOP LEVEL PRODUCT) | | | 98.0% | 95.0% | 98.0% |
| 17 | | | | | | |
| 18 | | | | | | |
| 19 | | Component Item | Component Source | | | |
| 20 | | | | Q | Q | Q |
| 21 | BOM and ITEM INFORMATION | S1 | LS3 | 1 | | 1 |
| 22 | BOM and ITEM INFORMATION | S2 | LS4 | | 1 | |
| 23 | BOM and ITEM INFORMATION | C1 | Buy | 1 | 2 | |
| 24 | BOM and ITEM INFORMATION | C2 | Buy | | | 1 |
| 25 | BOM and ITEM INFORMATION | C3 | Buy | | | |
| 26 | | | | | | |
| 27 | | LINE LS3 | [100i] | | | |
| 28 | Accumulate and Aggregate | 89 | [100j] | | | |
| 29 | Accumulate and Aggregate | 16.697 | | | | |
| 30 | Accumulate and Aggregate | 97.6% | [100k] | | | |
| 31 | Algorithm or Empirical Model | 4 | | [100p] | | |
| 32 | | | | | | |
| 33 | ITEM INFORMATION (SKU, SUB LEVEL ITEM) | | | S1 | | |
| 34 | ITEM INFORMATION (SKU, SUB LEVEL ITEM) | | | 89 | [100m] | |
| 35 | | | | | | |
| 36 | ITEM INFORMATION (SKU, SUB LEVEL ITEM) | | | 8.349 | [100n] | |
| 37 | ITEM INFORMATION (SKU, SUB LEVEL ITEM) | | | 97.6% | | |
| 38 | ITEM INFORMATION (SKU, SUB LEVEL ITEM) | | | 2 | | |
| 39 | ITEM INFORMATION (SKU, SUB LEVEL ITEM) | | | 379 | [100v] | |
| 40 | | | | | | |
| 41 | | | | | | |
| 42 | | Component Item | Component Source | | | |
| 43 | | | | Q | | |
| 44 | BOM and ITEM INFORMATION | C1 | Buy | | | |
| 45 | BOM and ITEM INFORMATION | C2 | Buy | 1 | | |
| 46 | BOM and ITEM INFORMATION | C3 | Buy | 5 | | |
| 47 | | | | | | |
| 48 | | | | | | |
| 49 | | Component C1 | | | Component C-2 | |
| 50 | Level 1: | | | | | |
| 51 | Accumulate and Aggregate | 130 | | [100q] | 18 | |
| 52 | Accumulate and Aggregate | 27.019 | | | 17.035 | |
| 53 | Accumulate and Aggregate | 96.8% | | | 92.2% | |
| 54 | Level 2: | | | | | |
| 55 | Accumulate and Aggregate | 0 | | | 134 | |
| 56 | | | | | | |
| 57 | Accumulate and Aggregate | 0.000 | | | 12.500 | |
| 58 | Accumulate and Aggregate | 0 | | | 96.4% | |
| 59 | Combined Levels: | | | | | |
| 60 | ITEM INFO (SKU, COMP ITEM) | 130 | | [100r] | 152 | |
| 61 | | | | | | |
| 62 | ITEM INFO (SKU, COMP ITEM) | 27.019 | | [100s] | 21.130 | |
| 63 | ITEM INFO (SKU, COMP ITEM) | 96.8% | | [100t] | 95.9% | |
| 64 | ITEM INFO (SKU, COMP ITEM) | 20 | | [100u] | 10 | |
| 65 | ITEM INFO (SKU, COMP ITEM) | 225 | | | 117 | |

| | G |
|---|---|
| 2 | FD (Forecast Demand) |
| 3 | FV (Forecast Variation) |
| 4 | S (Target Service Level) |
| 5 | Item Source |
| 8 | LD = FD1 + FD2 + ... |
| 9 | LV = SQ ROOT of ((FV1^2) + (FV2^2) + ...) |
| 10 | LS = ((S1 + FD1) + (S2 + FD2) + ...) / LD |
| 11 | STF (Smoothing Time Frame) |
| 12 | LT (Lead Time for Line) |
| 13 | |
| 14 | D = FD |
| 15 | SV = (FV + (SQ ROOT of Line STF)) / Line STF |
| 16 | S = S |
| 20 | Item Bill of Materials (BOM) and Quantity per Assembly (Q): |
| 21 | Top Level BOM; Component Item Source |
| 22 | Top Level BOM; Component Item Source |
| 23 | Top Level BOM; Component Item Source |
| 24 | Top Level BOM; Component Item Source |
| 25 | Top Level BOM; Component Item Source |
| 28 | LD = (D1 + BOM1 Q) + (D2 + BOM2 Q) + ... |
| 29 | LV = SQ ROOT of (((SV1 + BOM1 Q)^2) + ((SV2 + BOM2 Q)^2) + ...) |
| 30 | LS = ((S1 + BOM1 Q) + (S2 + BOM2 Q) + ...) / LD |
| 31 | STF (Smoothing Time Frame) |
| 32 | |
| 33 | Smoothed: |
| 34 | D = (D1 + BOM1 Q) + (D2 + BOM2 Q) + ... |
| 35 | SV = SQ ROOT of (((SV1 + BOM1 Q + (LV1 + SQ ROOT of Line1 STF) / Line 1 STF)^2 + |
| 36 | ((SV2 + BOM2 Q + (LV2 + SQ ROOT of Line2 STF) / Line2 STF)^2) + ...) |
| 37 | S = LS |
| 38 | LT = Replenishment Lead Time |
| 39 | SS = ((inverse norm cumul distribution: Mean = D + LT, Std Dev = V + SQ ROOT (LT), Prob = S) − (D + LT)) + (D + STF) |
| 43 | Item Bill of Materials (BOM) and Quantity per Assembly (Q): |
| 44 | Sub Level BOM; Component Item Source |
| 45 | Sub Level BOM; Component Item Source |
| 46 | Sub Level BOM; Component Item Source |
| 50 | Smoothed: |
| 51 | D = (D1 + BOM1 Q) + (D2 + BOM2 Q) + ... |
| 52 | V = SQ ROOT of (((SV1 + BOM1 Q)^2) + ((SV2 + BOM2 Q)^2) + ...) |
| 53 | S = ((S1 + BOM1 Q) + (S2 + BOM2 Q) + ...) / D |
| 54 | |
| 55 | D = (D1 + BOM1 Q) + (D2 + BOM2 Q) + ... |
| 56 | SV = SQ ROOT of (((SV1 + BOM1 Q) + (LV1 + SQ ROOT of Line1 STF) / Line1 STF)^2 + |
| 57 | ((SV2 + BOM2 Q + LV2 + SQ ROOT of Line2 STF) / Line2 STF)^2) + ...) |
| 58 | S = SQ ROOT of ((LS1^2) + (LS2^2) + ...) |
| 59 | |
| 60 | D = (D1 + BOM1 Q) + (D2 + OM2 Q) + ... |
| 61 | SV = SQ ROOT of (((SV1 + BOM1 Q) + (LV1 + SQ ROOT of Line1 STF) / Line1 STF)^2 + |
| 62 | ((SV2 + BOM2 Q + LV2 + SQ ROOT of Line2 STF) / Line2 STF)^2) + ...) |
| 63 | S = ((S1 + BOM1 Q) + (S2 + BOM2 Q) + ...) / D |
| 64 | LT = Replenishment Lead Time |
| 65 | SS = (inverse norm cumul distribution: Mean = D+LT, Std Dev = V + SQ ROOT (LT), Prob = S)−(D+LT) |

FIG. 2b

| | H | I | J | K |
|---|---|---|---|---|
| 1 | PRODX | PRODY | PRODZ | |
| 2 | 20 | 4 | 1 | |
| 3 | 20 | 12 | 5 | |
| 4 | 95.0% | 90.0% | 90.0% | |
| 5 | LF2 | LF2 | LF2 | |
| 7 | | | | LINE LF2 |
| 8 | | | | 25 |
| 9 | | | | 23.854 |
| 10 | | | | 94.0% |
| 11 | | | | 5 |
| 12 | | | | 8 |
| 14 | 20 | 4 | 1 | |
| 15 | 8.944 | 5.367 | 2.236 | |
| 16 | 95.0% | 90.0% | 90.0% | |
| 20 | Q | Q | Q | |
| 21 | | 1 | | |
| 22 | 1 | | 10 | |
| 23 | 1 | | | |
| 24 | | 2 | 5 | |
| 27 | | | | LINE LS4 |
| 28 | | | | 45 |
| 29 | | | | 26.315 |
| 30 | | | | 93.9% |
| 31 | | | | 8 |
| 33 | | | S2 | |
| 34 | | | 45 | |
| 36 | | | 9.304 | |
| 37 | | | 93.9% | |
| 38 | | | 12 | |
| 39 | | | 410 | |
| 43 | | | Q | |
| 45 | | | 1 | |
| 46 | | | 10 | |
| 48 | | Compo- | | |
| 49 | | nent C3 | | |
| 51 | | 0 | | |
| 52 | | 0.000 | | |
| 53 | | 0 | | |
| 55 | | 895 | | |
| 57 | | 101.974 | | |
| 58 | | 0.95754 | | |
| 60 | | 895 | | |
| 62 | | 101.974 | | |
| 63 | | 95.8% | | |
| 64 | | 5 | | |
| 65 | | 393 | | |

FIG. 2c

METHOD OF DETERMINING SAFETY STOCK LEVELS

RELATED APPLICATIONS

The present application claims benefit of priority to U.S. Provisional Patent Application No. 60/884,065, filed Jan. 9, 2007 and titled "Method Of Determining Safety Stock Levels", which is incorporated herein by reference.

BACKGROUND

Businesses face many difficulties in determining and updating safety stock levels for their purchased and manufactured items, including both products and components. For example, it is not uncommon for a production business to have tens of thousands, and often many more, of such items. However, each item's safety stock level may have an adverse effect on two opposing business goals: service level (which can suffer from product or component shortages); and return on inventory investment (which can suffer from product or component excesses). The balance that achieves these two goals is optimal safety stock—just enough "extra" of each product and component to achieve the desired service level, but no more.

Many methods of determining safety-stock levels exist to improve service level and inventory investment. For example, Material Requirements Planning ("MRP") techniques and software are often used to determine materials required to support a forecast mix and volume of top-level products. Top-level products are items ordered by, and sent to, a customer external to the supply chain. A top-level product is generally not represented by a planning bill-of-materials. As used herein, MRP also includes the bill-of-materials ("BOM") and supply-chain structures that enable MRP to determine component requirements for manufactured and purchased items.

As businesses reduce their supply-chain lead times, irregular demand variation (as contrasted with other types of variation, such as slope, seasonality, cycle and forecast-inaccuracy) comprises a larger consideration when determining safety stock. Irregular variation increases on a power curve as lead time decreases linearly. At a minimum, acceptable prior art methods of determining demand-irregularity safety-stock levels utilize four inputs: 1) mean usage or demand; 2) irregular-demand variation around the mean; 3) target service level; and 4) lead or replenishment time. While this list of inputs is short, the effort to gather and analyze these inputs must be multiplied by the tens of thousands or more components a business may have.

Additionally, mean and variation analyses may require time-series data that have been cleaned of invalid data points, that have enough data points to be reliable, and that have been normalized for slope and seasonality. All of this may take place for the time-series of each of the tens of thousands of components. Further, optimal service level for a component must correctly represent an aggregate of the target service levels of the products which consume the component. However, a component's target service level must often be assigned arbitrarily and on the side of caution, which generally results in excess safety stock.

Due to complexities in the prior art methods of determining safety stock levels, many businesses are unable to invest the time required to obtain the inputs necessary to determine safety-stock level. As a result, they are also unable to achieve and sustain either of the two fundamental but opposing business goals of having a suitable service level and a suitable return on inventory investment.

SUMMARY

In one embodiment, a method of determining safety-stock levels includes the steps: (A) introducing top-level product forecast demand, top-level product forecast demand irregular variation, and top-level product target service level to a MRP system where the top-level product forecast demand, the top-level product forecast demand irregular variation, and the top-level product target service level relate to a top-level product including a plurality of component items respectively having a source and a lead time; (B) accumulating and aggregating a forecast demand, a forecast demand irregular variation, and a target service level for MRP production line sources of the top-level product; (C) determining a smoothed-variation value for the top-level product; (D) accumulating top-level product forecast demand, top-level product smoothed variation, and top-level product target service level for a first supply-chain level of the component items and all subsequent intermediate supply-chain levels; (E) accumulating product forecast demand, smoothed variation, and target service level for each component item source; (F) determining aggregate demand, aggregate variation, and aggregate service level for each component item; and (G) calculating safety stock using the aggregate demand, aggregate variation, aggregate service level, and lead time for the component items.

In another embodiment, a method of determining safety stock levels includes the steps: (A) determining aggregate top-level product demands; (B) determining aggregate top-level product demand variations; (C) determining aggregate top-level product target service levels; (D) determining respective smoothing time frames for a plurality of mixed-product lines; and (E) incorporating the aggregate top-level product demands, the aggregate top-level product demand variations, the aggregate top-level product target service levels, and the smoothing time frames into a material requirements planning system to determine safety stock levels.

In another embodiment, a method of determining safety stock levels includes the steps: (A) determining aggregate top-level product demands; (B) determining aggregate top-level product demand variations; (C) determining aggregate top-level product target service levels; and (D) using the aggregate top-level product demands, the aggregate top-level product demand variations, and the aggregate top-level product target service levels to determine safety stock levels.

In another embodiment, a software product comprises instructions, stored on computer-readable media, wherein the instructions, when executed by a computer, perform steps to determine safety stock levels. More particularly, the software product comprises: (A) instructions for introducing top-level product forecast demand, top-level product forecast demand variation, and top-level product target service level to a MRP system where the top-level product forecast demand, the top-level product forecast demand irregular variation, and the top-level product target service level relate to a top-level product including a plurality of component items respectively having a source and a lead time; (B) instructions for accumulating and aggregating a forecast demand, a forecast demand variation, and a target service level for MRP production line sources of the top-level product; (C) instructions for determining a smoothed-variation value for the top-level product; (D) instructions for accumulating top-level product forecast demand, top-level product smoothed variation, and top-level product target service level for a first supply-chain level of the component items and all subsequent intermediate supply-chain levels; (E) instructions for accumulating product forecast demand, smoothed variation, and target service level for each component item source; (F) instructions for determining aggregate demand, aggregate variation, and aggregate service level for each component item; and (G) instructions for calculating safety stock using the aggregate demand, aggregate variation, aggregate service level, and lead time for the component items.

In another embodiment, a software product comprises instructions, stored on computer-readable media, wherein the instructions, when executed by a computer, perform steps to determine safety stock levels. More particularly, the software product comprises: (A) instructions for determining aggregate top-level product demands; (B) instructions for determining top-level product demand variations; (C) instructions for determining top-level product target service levels; (D) instructions for determining respective smoothing time frames for a plurality of mixed-product lines; and (E) instructions for incorporating the aggregate top-level product demands, the top-level product demand variations, the top-level product target service levels, and the smoothing time frames into a material requirements planning system to determine safety stock levels.

In another embodiment, a system for determining safety stock levels includes at least one processor and computer memory coupled to the processor. The computer memory has recorded within it machine readable instructions for: (A) introducing top-level product forecast demand, top-level product forecast demand variation, and top-level product target service level to a MRP system where the top-level product includes a plurality of component items respectively having a source and a lead time; (B) accumulating and aggregating a forecast demand, a forecast demand variation, and a target service level for MRP production line sources of the top-level product; (C) determining a smoothed-variation value for the top-level product; (D) accumulating top-level product forecast demand, top-level product smoothed variation, and top-level product target service level for a first supply-chain level of the component items and all subsequent intermediate supply-chain levels; (E) accumulating product forecast demand, smoothed variation, and target service level for each component item source; (F) determining aggregate demand, aggregate variation, and aggregate service level for each component item; and (G) calculating safety stock using the aggregate demand, aggregate variation, aggregate service level, and lead time for the component items.

In another embodiment, a system for determining safety stock levels includes at least one processor and computer memory coupled to the processor. The computer memory has recorded within it machine readable instructions for: (A) determining aggregate top-level product demands; (B) determining top-level product demand variations; (C) determining top-level product target service levels; (D) determining respective smoothing time frames for a plurality of mixed-product lines; and (E) incorporating the aggregate top-level product demands, the top-level product demand variations, the top-level product target service levels, and the smoothing time frames into a material requirements planning system to determine safety stock levels.

BRIEF DESCRIPTION OF THE DRAWINGS

FIGS. 2a, 2b, and 2c collectively show an exemplary spreadsheet in accord with the method of FIG. 1.

DETAILED DESCRIPTION

Figure 1:
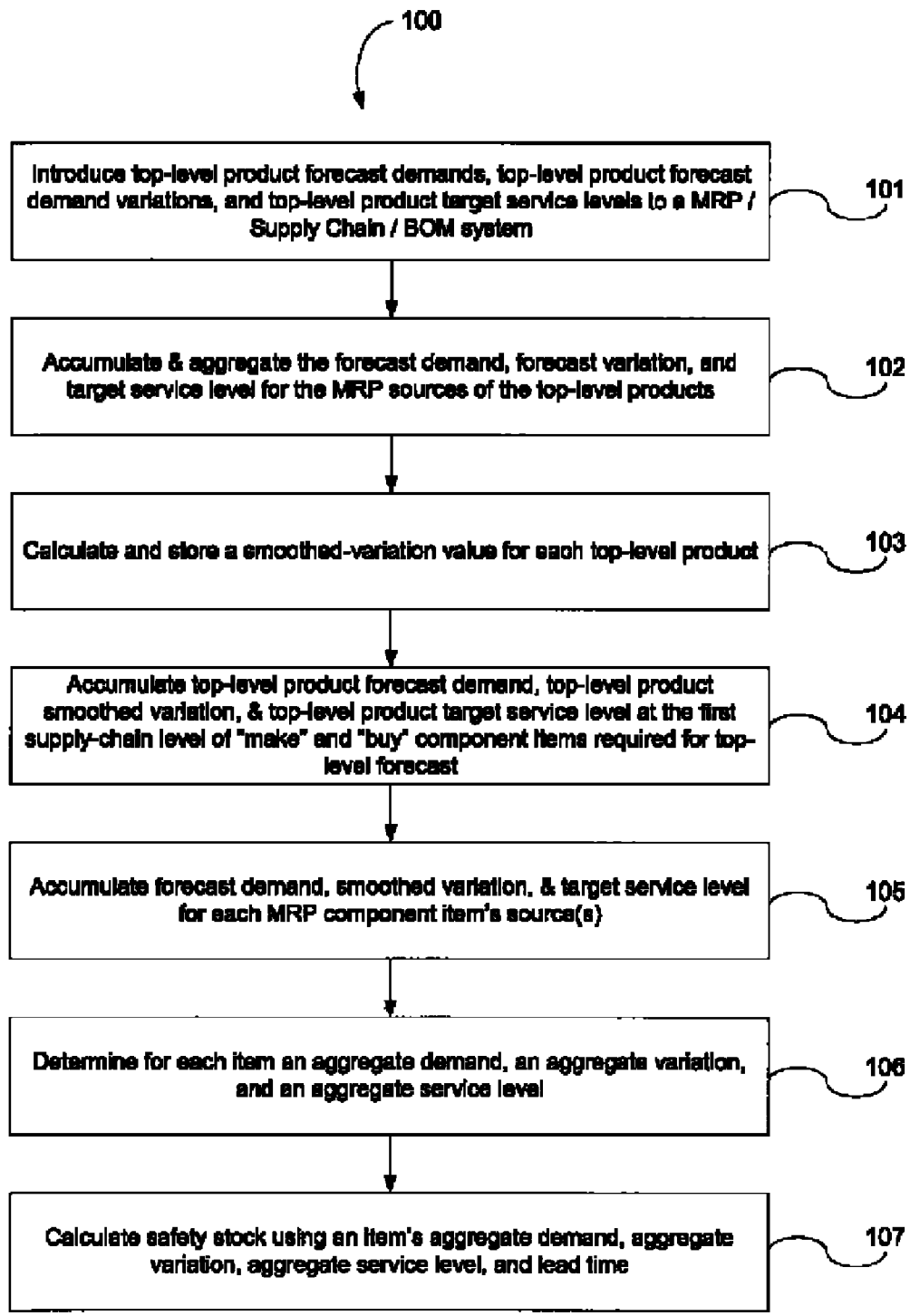
FIG. 1 shows one method for determining safety stock levels, in accord with an embodiment.

FIG. 1 shows one method 100 for determining safety stock levels, in accord with an embodiment. At step 101, top-level-product forecast demands (e.g., daily average), top-level-product forecast demand variations (e.g., daily), and top-level-product target service levels are introduced to a typical MRP/Supply Chain/BOM system (referred to as "MRP" system). Method 100 requires only the more fundamental aspects of MRP, or in other words, the functionality that determines gross requirements. Method 100 does not require time-phasing, horizontal planning, time fences, suggested POs and work orders, suggested pull-ins/push-outs/cancellations, netting gross requirements against on-hand/on-order/scheduled/in-process, etc., though these more complex aspects may be used with method 100.

Forecast demand is typically daily, though this need not be the case, and forecast demand variation is generally represented with the same units used for forecast demand (e.g., daily). For each top-level product, forecast demand typically represents short-term growth (seasonality), growth (trend), and long-term growth (cycle). Forecast demand variation (also referred to herein as "forecast variation") represents irregular variation (e.g., a standard deviation when the associated normalized time-series demand is a normal distribution); forecast variation does not represent any type of forecast-accuracy variation. Target service level represents the desired percentage of product units that will be on-time to the customer. Alternatively, depending on the statistical techniques used to calculate the various statistically-valid values described herein, a target service level (S) may be expressed as a "Z" value, for instance, instead of as a percentage. For the sake of consistency and clarity, S is generally represented herein as a percentage.

While prior art MRP techniques use top-level-product forecast demand as an input, they do not use irregular-demand forecast variation or target service level as top-level-product inputs that accumulate and aggregate as they flow through MRP to the components. As discussed below, method 100 may apply the same MRP accumulation techniques to forecast variation, irregular forecast demand variation, and target service level that are currently applied to forecast demand. However, method 100 does not preclude use of established forecast-accuracy techniques for determining safety stock levels which may be incremental to the safety stock levels as determined using the method 100.

Turning to the spreadsheet 200 of FIGS. 2a, 2b and 2c, an exemplary top-level product (PRODA) has a forecast daily average demand (FD) of 80 labeled "100a", a forecast variation (FV) of 20 labeled "100b", and a target service level (S) of 98.0% labeled "100c". Returning to FIG. 1, method 100 proceeds from step 101 to step 102.

At step 102, MRP accumulates each forecast demand, forecast variation, and target service level for the MRP line or cell sources of these top-level products. An accumulation is a grouping of multiple individual data related to a common item or supply-chain source, and a line (also called a "cell") is a grouping of resources that produces a grouping of products; a cell is the lowest planning level of production resource constraint. To accumulate each forecast demand, forecast variation, and target service level for the MRP production line sources of the top-level products, MRP typically uses established Capacity Requirements Planning techniques, or "CRP". For each product, for example, forecast demand, forecast variation, and the target service level multiplied by the forecast demand may be accumulated at the source of supply defined by each top-level product's supply chain. "Make" products may be sourced to a cell, and "buy" products may be sourced to a supplier. While typical MRP techniques use accumulation techniques for forecast demand, they do not apply accumulation techniques to forecast irregular variation or target service level.

Still referring to step 102 of method 100, MRP then aggregates (through use of established mathematical techniques) accumulated forecast demand, forecast variation, and target service level for the MRP sources of these top-level products. An aggregation is a single result of calculations applied to an accumulation. More particularly, a line or cell demand (denoted "LD" in spreadsheet 200) may be determined by aggregating accumulated forecast demand (described above) and item aggregate demand (described below) in order to represent total demand for the line or cell. Typical MRP algorithms, bills of materials, and appropriate supply-chain modifiers (e.g., scrap and yield factors) may be used in the aggregating process. For example, existing basic MRP demand-aggregation algorithms resemble: $LD = FD_1 + FD_2 + D_1 \ldots$ Item aggregate demand (denoted "D" in spreadsheet 200) is accumulated and aggregated forecast demand that represents total demand for an item. Item aggregate demand is typically calculated using MRP algorithms, bills-of-materials (BOMs), supply chains, and appropriate supply-chain modifiers (e.g., scrap and yield factors). For example, existing basic MRP item demand-aggregation algorithms resemble:

$$D = ((FD_1 * BOM_1 \; Qty) + (FD_2 * BOM_2 \; Qty) + (D_1 * BOM_3 \; Qty)) \ldots$$

Existing MRP techniques typically store the result of this aggregation as a value commonly called "gross requirements", and this value may either be stored permanently as part of each item's master data, or it may be stored in a virtual manner.

A line or cell variation (denoted "LV" in spreadsheet 200) may be determined by aggregating accumulated forecast variation and variation of demand (sometimes referred to as "variation of usage", and generally referred to as being daily) in order to represent demand variation for the line or cell. Typical MRP techniques do not perform this aggregation, and any appropriate statistical technique may be used to aggregate variation. For example, with a normal distribution, independent standard deviations are commonly aggregated as:

$$\text{SQUARE ROOT OF } (FV_1^2 + FV_2^2 + V_1^2 \ldots).$$

In order to represent total on-time demand for the line or cell, a line or cell service level (denoted "LS" in spreadsheet 200) may be determined by aggregating: 1) accumulated target service levels multiplied by forecast demand; and 2) accumulated target service levels multiplied by item aggregate demand. Typical MRP algorithms (usually, the Capacity Requirements Planning, or CRP, feature of MRP), bills of materials and appropriate supply-chain modifiers (e.g., scrap yield) may be used in the aggregating process. Once aggregated, the sum may be divided by line demand to result in a weighted average. An exemplary algorithm is:

$$LS = \text{SUM OF } (S_1 \times D_1, S_2 \times D_2, FS_1 \times FD_1, \ldots)/LD.$$

Typical MRP techniques do not perform this aggregation, and an appropriate mathematical technique, whether the basic one above or a more complex technique, may be used to aggregate service level.

Turning to spreadsheet 200 of FIGS. 2a, 2b, and 2c, an exemplary line "Line LF1" has a line demand of 100 labeled "100d", a line variation of 26.926 labeled "100e", and a line service level of 97.6% labeled "100f". Returning to FIG. 1, method 100 proceeds from step 102 to step 103.

At step 103, MRP calculates and stores a smoothed-variation value for each top-level product by applying any established, statistically-valid technique that includes an established, valid line or cell smoothing time frame and the top-level-product forecast variation. A smoothing time frame ("STF") is a result from an algorithm or empirical model representing the horizon of demand (to-order) or horizon of usage (to-stock) required for a line or cell to achieve target service level at a desired resourced capacity. For assemble-to-order, make-to-order, or engineer-to-order situations, STF may equal the lesser of: 1) the calculated STF; and 2) the maximum horizon for commit to configuration. Similarly, for a make-to-stock situation, STF may equal the maximum of: 1) the calculated STF; and 2) the result of a valid days-of-requirements analysis. No equivalent to STF exists in MRP because STF has no effect on the gross, net, and time-phased requirements that existing MRP addresses; STF instead affects only the magnitude of the variation that certain methods disclosed herein process through an MRP framework.

An adequate smoothing-time-frame algorithm or empirical model for a line or cell may require the following inputs: line demand; line variation; line service level; a distribution of lead times (for to-order products and components) or a target finished-inventory days-on-hand level (for to-stock products and components); and a target line or cell capacity. While a source for demand, variation, and service level is the MRP accumulation described herein, distribution of lead times, target days-on-hand, and target line capacity do not necessarily derive from MRP. Lead-time distribution may come from historical sales-order analysis, and days-on-hand and target line capacity may result from financial break-even or ROI analyses. With these inputs, an adequate smoothing-time-frame algorithm or empirical model determines each line's or cell's smoothing time frame in order to meet aggregate demand and variation at a service level. Typically, a smoothing-time-frame algorithm or empirical model also determines each line's or cell's resource level required to meet aggregate demand and variation at a target service level.

In the case of to-stock products and components, this calculated smoothing time frame also represents the basic MRP target days-on-hand for each product and component produced in the line or cell. A typical MRP technique utilizes safety stock to achieve this target days-on-hand, or its equivalent expressed as a quantity or a factor for each product and component produced in the line or cell. Typical MRP technique also adds to this safety stock, using a statistically-valid safety stock calculation to achieve the target service level for usage or demand variation during each product's and component's total lead time (denoted "LT" in FIG. 2) for the line or cell. For example, if Product XYZ having a forecast demand (FD) of 100 and a forecast variation (FV) of 20 is produced on Line A with a smoothing time frame (STF) of 5 days and a lead time (LT) of 2 days, its safety stock quantity (SS) may be calculated as:

$$SS = Z * 20 FV * (\text{SQUARE ROOT OF } 2 LT)$$

The smoothing time frame as used in this sample calculation may be overridden by other established line or cell constraint analyses that result in a value greater than the calculated smoothing time frame, such as days of requirements in a high-mix, setup-intensive line or cell; or by a value lower than calculated smoothing time frame, such as configuration-commit horizon in a frequent-engineering-change environment.

Still referring to step 103 of method 100, each "make" and "buy" item has an aggregate variation value resulting from the accumulated variations of all the products and items which consume the item. For example, independent normal-distribution variations are commonly aggregated using: SQUARE ROOT OF $(V_1^2+V_2^2+FV_1^2 \ldots )$. This value may then be smoothed by the lead time of the supply-chain source of the item. If the source is a line or cell, the lead time is generally based on the total replenishment time of the line or cell; if the source is an external supplier, the lead time is generally based on replenishment time from the supplier. For example, normal-distribution variations (V) are commonly smoothed over lead time (LT) using:

$$(\text{SQUARE ROOT OF } (V_1^2+V_2^2+FV_1^2 \ldots ))^* (\text{SQUARE ROOT OF LT})/\text{LT}$$

The new value may then be divided by lead time to represent the item's smoothed variation for a basic unit of lead time (i.e., a day). For example, a normal-distribution smoothed variation (SV) may be aggregated as:

$$SV=((\text{SQUARE ROOT OF}(V_1^2+V_2^2+FV_1^2 \ldots ))^* \text{SQUARE ROOT OF LT})/\text{LT}$$

If the item is a "make" item, sourced from a line or cell, then that line's or cell's smoothing time frame may be used in place of lead time. While typical MRP item master information does not contain this smoothed variation value, the current method may make this value a part of the item's master data (stored either permanently or in a virtual manner).

Turning to spreadsheet 200 of FIGS. 2a, 2b, and 2c, exemplary top-level product "PRODA" has a smoothed-variation value of 14.142 (labeled "100g" in FIG. 2), which represents the smoothing influence of the source-line "LF1" at a smoothing time frame (denoted "STF" in spreadsheet 200) of two days (labeled "100h" in spreadsheet 200). Returning to FIG. 1, method 100 proceeds from step 103 to step 104.

At step 104, MRP accumulates top-level-product forecast demand, top-level-product smoothed variation, and top-level-product target service level at the first supply-chain level of "make" and "buy" component items required for the top-level forecast. In doing so, it may use, for example, bill of materials quantities, MRP sources, and applicable MRP modifiers.

For each first-supply-chain-level MRP source, MRP aggregates accumulated top-level-product forecast demand, top-level-product smoothed variation and top-level-product target service level. As a result, each first-supply-chain-level MRP line or cell source has an aggregate service level. Alternatively, but less optimally, each component item's aggregate service level may result, not from the aggregated service level of its line or cell source, but from the aggregation of the service levels of all the top-level items which consume the component item (note: this is less optimal because it does not take full advantage of service-level subsidization offered by a mixed-model line or cell). Each first-supply-chain-level MRP external-supplier source has an aggregate service level.

Turning to spreadsheet 200 of FIGS. 2a, 2b, and 2c, exemplary Line "LS3" has an aggregate demand of 89 (labeled "100i" in spreadsheet 200), an aggregate variation of 16.697 (labeled "100j" in spreadsheet 200), and an aggregate service level of 97.6% (labeled "100k" in spreadsheet 200). Returning to FIG. 1, method 100 proceeds from step 104 to step 105.

At step 105, MRP accumulates forecast demand, smoothed variation, and target service level for each MRP component item's source (or sources, depending on the complexity of the supply chain). Each first-supply-chain-level MRP line or cell source aggregate service level discussed in relation to step 104 applies to each component item provided by that line or cell source. Each first-supply-chain-level MRP external-supplier source aggregate service level discussed in relation to step 104 applies to each component-source combination.

Turning to spreadsheet 200 of FIGS. 2a, 2b, and 2c, after the first supply-chain level, "make" item "S1" (which is sourced from Line "LS3") has an aggregate demand of 89 (labeled "100m" in spreadsheet 200). Item "S1" has aggregate variation of 8.349 (labeled "100n" in spreadsheet 200), which represents the smoothing influence of the source-line "LS3" smoothing time frame of four days (labeled "100p" in spreadsheet 200). After the first supply-chain level, "buy" item "C2" has an accumulated demand of 18 (labeled "100q" in spreadsheet 200). Since "C2" will accumulate and aggregate more demand, variation, and service level activity as a result of further supply-chain levels, these first-level values are not meaningful by themselves.

Because MRP supply-chain and BOM relationships can be complex, the accumulations and aggregations described in relation to steps 104 and 105 may continue as dictated by the number of supply-chain levels required to represent the actual procurement and production of the top-level products. Returning to FIG. 1, method 100 proceeds from step 105 to step 106.

At step 106, after MRP has accumulated and aggregated all top-level-product forecast demands, top-level-product forecast variations, and top-level-product target service levels through all supply-chains and bills of materials (applying all appropriate MRP modifiers), it determines for each item an aggregate demand (often called "gross requirements" in MRP terminology), an aggregate variation, and an aggregate service level.

More particularly, all of the accumulated target service levels multiplied by forecast demands and all of the accumulated target service levels multiplied by item aggregate demand are aggregated in order to represent total on-time demand for the item, using (for example) typical MRP algorithms, bills of materials (BOMs), and appropriate supply-chain modifiers (e.g., scrap and yield). This sum is then divided by item aggregate demand to obtain the aggregate service level, such as in the following example:

$$S=((S_1*D_1*BOM_1\, Qty)+(FS_2*FD_2*BOM_2\, Qty)+ \ldots )/D$$

Prior art MRP techniques do not perform this aggregation, and some MRP item masters do not contain this aggregate service level value. Any appropriate mathematical technique may be used for this aggregation, whether the basic one above or a more complex technique, and this value may be made part of the item's master data (stored either permanently or in a virtual manner).

Turning to spreadsheet 200 of FIGS. 2a, 2b, and 2c, exemplary "buy" item "C2" has a final aggregate demand of 152 (labeled "100r" in spreadsheet 200), an aggregate variation of 21.130 (labeled "100s" in spreadsheet 200), and an aggregate service level of 95.9% (labeled "100t" in spreadsheet 200). Returning to FIG. 1, method 100 proceeds from step 106 to step 107.

At step 107, for each item, MRP uses the item's aggregate demand, aggregate variation, aggregate service level, and lead time in an appropriate safety-stock calculation. For a make-to-stock item, the safety-stock calculation may also use the smoothing time frame from the line or cell from which the item is sourced.

An adequate safety stock calculation for any item (including top-level "make", top-level "buy", component-level "make", or component-level "buy") may utilize the following inputs: lead time (how much time transpires from when a unit of an item is consumed until another is available to replace it; demand (also referred to as mean usage and typically appearing in daily units); variation of demand (typically appearing in daily units); and target service level.

In an embodiment, to calculate safety stock for an item based on top-level-product factors through a supply chain as described above (instead of using item-level inputs), the calculation inputs utilize: lead time (denoted "LT" in spreadsheet 200), which may be modified by typical MRP values such as queue and move time; item aggregate demand (denoted "D" in spreadsheet 200); smoothed aggregate variation for the item (denoted "SV" in spreadsheet 200); and aggregate line service level (denoted "LS" and equal to "S" in spreadsheet 200). For example, a safety stock calculation using these parameters, for an item with normal-distribution variation, uses the inverse of the normal cumulative distribution on:

Mean=D*LT

Standard Deviation=SV*SQUARE ROOT(LT)

Probability=S

From this result is subtracted (D*LT), and the remaining amount is safety stock. Other valid safety stock calculations may accommodate more complexities, such as lead-time variation, forecast inaccuracy, non-normal distributions, etc.

Typical MRP techniques may also use safety stock to maintain a target days-on-hand (DOH) inventory level for items that are make-to-stock. This can be expressed by, for example: D*DOH and D*STF. In this case, this resulting quantity, or its days-on-hand or factor equivalent, may be added to the statistically-calculated safety stock discussed immediately above.

Method 100 may further use the result of the safety-stock calculation as the safety stock value in a typical MRP technique for each appropriate MRP item. For example, in a typical MRP technique, an item's safety stock value is added to the item's MRP-calculated gross requirements.

Turning to spreadsheet 200 of FIGS. 2a, 2b, and 2c, exemplary "buy" item "C2" has a safety stock quantity of 117 (labeled "100u38 in spreassheet 200), which reflects the values of this item's aggregate demand, aggregate variation, aggregate service level, and lead time. The exemplary "C2" safety stock, here represented as a quantity of 117, may also be represented in a number of typical MRP formats, such as a factor of 0.077 (117/(152D*10 LT), or days on hand of 0.77 (117/152 D). Also, for example, make-to-stock "make" item "S1" has a safety stock quantity of 379 (labeled 100v" in spreadsheet 200), which reflects the values of this item's aggregate demand, aggregate variation, aggregate service level, lead time, and the source-line "LS3" smoothing time frame. The safety stock quantity of 379 can similarly be represented in various MRP formats as generally noted above.

When executed as described above, method 100 uses top-level product demand, variation, and service levels to determine component demand, variation, and service levels. Method 100 further (as described above) quantifies the smoothing effect that mixed-model lines, demand-visibility horizons, target finished inventory levels, smoothing time frames, and lead times have on each item's optimal service level and aggregate demand variation. Notably, method 100 may utilize pre-existing business techniques of MRP, bills of materials, and supply-chain structure as described above and may determine safety stock levels without reference to each component item's historical usage, each component item's historical usage variation, and an arbitrary target service level for each component item.

Figure 3:
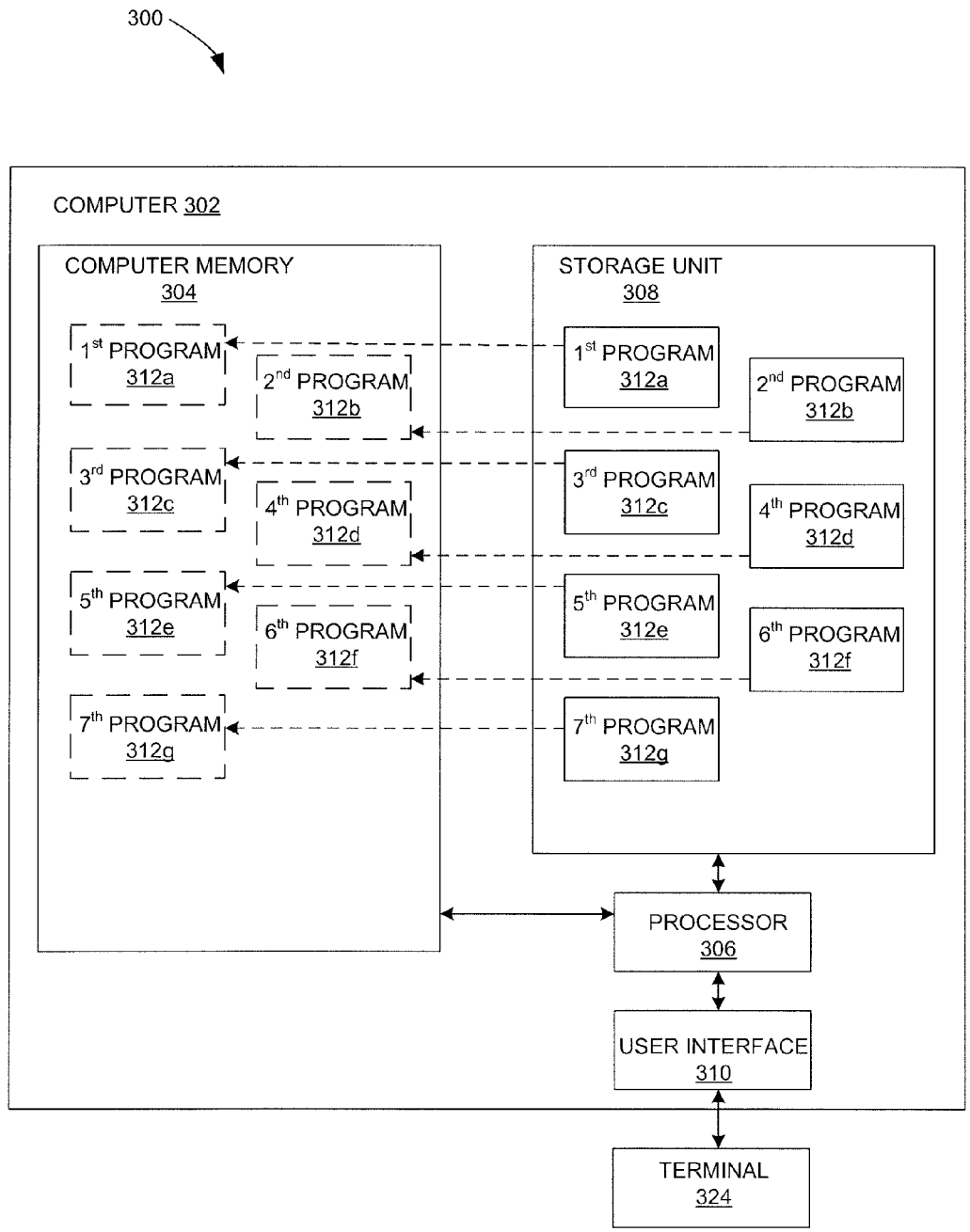
FIG. 3 shows an exemplary system that determines safety stock levels, in accord with an embodiment.

FIG. 3 illustrates an exemplary system 300 that determines safety stock levels. System 300 has a computer 302 with computer memory 304, a processor 306, a storage unit 308, and a user interface 310. Storage unit 308 maybe, for example, a disk drive that stores programs and data of computer 302. Storage unit 308 is illustratively shown storing a first program 312a, a second program 312b, a third program 312c, a fourth program 312d, a fifth program 312e, a sixth program 312f, and a seventh program 312g (collectively referred to herein as 312a-312g). It should be understood that the respective programs could be stored in storage units of separate computers and that data could be transferred between those storage units (the transfer of data is known in the art) or that respective programs 312a-312g could be combined into one or more program. Dashed outlines within computer memory 304 represent software programs 312a-312g loaded into memory 304 and executed by processor 306, and dashed lines between storage unit 308 and computer memory 304 illustrate the transfer of programs 312a-312g between storage unit 308 and computer memory 304.

In one example, the seven programs 312a-312g, under control of processor 306, perform steps 101, 102, 103, 104, 105, 106, and 107 set forth above to determine safety stock levels.

In one example, user interface 310 connects to a terminal 324 (e.g., a keyboard) external to computer 302. The user may utilize terminal 324 to input data to system 300, or data may be input through other methods known in the art Those skilled in the art appreciate that variations from the specified embodiments disclosed above are contemplated herein and that the described embodiments are not limiting. The description should not be restricted to the above embodiments, but should be measured by the following claims.

The invention claimed is:

1. A software product comprising instructions, stored on computer-readable media, wherein the instructions, when executed by a computer, perform steps to determine safety stock levels, comprising:

instructions for introducing top-level product forecast demand, top-level product forecast demand variation, and top-level product target service level to a MRP system;

wherein the top-level product forecast demand, the top-level product forecast demand irregular variation, and the top-level product target service level relate to a top-level product including a plurality of component items respectively having a source and a lead time;

instructions for accumulating and aggregating a forecast demand, a forecast demand variation, and a target service level for MRP production line sources of the top-level product;

instructions for determining a smoothed-variation value for the top-level product;

instructions for accumulating top-level product forecast demand, top-level product smoothed variation, and top-level product target service level for a first supply-chain level of the component items and all subsequent intermediate supply-chain levels;

instructions for accumulating product forecast demand, smoothed variation, and target service level for each component item source;

instructions for determining aggregate demand, aggregate variation, and aggregate service level for each component item; and instructions for calculating safety stock using the aggregate demand, aggregate variation, aggregate service level, and lead time for the component items;

wherein the smoothed-variation value is one of:
  a) the lesser of a calculated value and a maximum horizon for commit to configuration; or
  b) the greater of a calculated value and a result of a days-of-requirements analysis;

the smoothed-variation value being the lesser of a calculated value and a maximum horizon for commit to configuration for assemble-to-order, make-to-order, and engineer-to-order situations; and the smoothed-variation value being the greater of a calculated value and a result of a days-of-requirements analysis for make-to-stock situations.

2. The software product of claim 1, wherein the instructions for aggregating a forecast demand, a forecast demand variation, and a target service level for MRP production line sources of the top-level product use at least one of a MRP algorithm, a bill of materials, and a supply-chain modifier.

3. The software product of claim 1, wherein the instructions for accumulating the forecast demand, the forecast demand irregular variation, and the target service level for the MRP line sources of the top-level product use at least one of a MRP algorithm, a bill of materials, and a supply-chain modifier.

4. The software product of claim 1, wherein the instructions for calculating safety stock using the aggregate demand, aggregate variation, aggregate service level, and lead time for the component items include:
  instructions for determining the inverse of a normal cumulative distribution where:
    mean=the aggregate demand multiplied by the lead time;
    standard deviation=the aggregate variation multiplied by the square root of the lead time; and
    probability=the aggregate service level; and
  instructions for subtracting from the inverse of the normal cumulative distribution the product of the aggregate demand multiplied by the lead time.

5. A system for determining safety stock levels, the system comprising:
  at least one processor; and
  computer memory coupled to the processor and having recorded within it machine readable instructions for:
    introducing top-level product forecast demand, top-level product forecast demand variation, and top-level product target service level to a MRP system; wherein the top-level product forecast demand, the top-level product forecast demand irregular variation, and the top-level product target service level relate to a top-level product including a plurality of component items respectively having a source and a lead time;
    accumulating and aggregating a forecast demand, a forecast demand variation, and a target service level for MRP production line sources of the top-level product;
    determining a smoothed-variation value for the top-level product;
    accumulating top-level product forecast demand, top-level product smoothed variation, and top-level product target service level for a first supply-chain level of the component items and all subsequent intermediate supply-chain levels;
    accumulating product forecast demand, smoothed variation, and target service level for each component item source;
    determining aggregate demand, aggregate variation, and aggregate service level for each component item; and
    calculating safety stock using the aggregate demand, aggregate variation, aggregate service level, and lead time for the component items;
  wherein the smoothed-variation value is one of:
    a) the lesser of a calculated value and a maximum horizon for commit to configuration; or
    b) the greater of a calculated value and a result of a days-of-requirements analysis;
  the smoothed-variation value being the lesser of a calculated value and a maximum horizon for commit to configuration for assemble-to-order, make-to-order, and engineer-to-order situations; and
  the smoothed-variation value being the greater of a calculated value and a result of a days-of-requirements analysis for make-to-stock situations.

6. The system of claim 5, wherein the instructions for aggregating a forecast demand, a forecast demand variation, and a target service level for MRP production line sources of the top-level product use at least one of a MRP algorithm, a bill of materials, and a supply-chain modifier.

7. The system of claim 5, wherein the instructions for accumulating the forecast demand, the forecast demand irregular variation, and the target service level for the MRP line sources of the top-level product use at least one of a MRP algorithm, a bill of materials, and a supply-chain modifier.

8. The system of claim 5, wherein the instructions for calculating safety stock using the aggregate demand, aggregate variation, aggregate service level, and lead time for the component items include:
  instructions for determining the inverse of a normal cumulative distribution where:
    mean=the aggregate demand multiplied by the lead time;
    standard deviation=the aggregate variation multiplied by the square root of the lead time; and
    probability=the aggregate service level; and
  instructions for subtracting from the inverse of the normal cumulative distribution the product of the aggregate demand multiplied by the lead time.

* * * * *